(12) United States Patent
Fayneh et al.

(10) Patent No.: US 6,810,486 B2
(45) Date of Patent: Oct. 26, 2004

(54) METHOD AND APPARATUS FOR DE-SKEWING A CLOCK USING A FIRST AND SECOND PHASE LOCKED LOOP AND A CLOCK TREE

(75) Inventors: Eyal Fayneh, Givatayim (IL); Earnest Knoll, Haifa (IL)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 09/818,614

(22) Filed: Mar. 28, 2001

(65) Prior Publication Data

US 2002/0144171 A1 Oct. 3, 2002

(51) Int. Cl.$^7$ ................................ G06F 1/04
(52) U.S. Cl. ........................ 713/503; 327/147
(58) Field of Search .................... 713/500, 503; 327/141, 147

(56) References Cited

U.S. PATENT DOCUMENTS 6,127,865 A * 10/2000 Jefferson .................... 327/149
6,239,627 B1 * 5/2001 Brown et al. ............... 327/116
6,625,559 B1 * 9/2003 Helder ....................... 702/117

OTHER PUBLICATIONS

IBM, Nested Phase–lock Loops for Board Level Clocking, Jun. 1, 1994, IBM Technical Disclosure Bulletin, vol. 37 Issue 6A, pp. 349–352.*

* cited by examiner

Primary Examiner—Dennis M. Butler
Assistant Examiner—Mark Connolly
(74) Attorney, Agent, or Firm—LeMoine Patent Services, PLLC

(57) ABSTRACT

A technique for de-skewing second and third clocks with respect to a first clock includes receiving the first clock and generating a fourth clock from the first and second clocks. A fifth clock and the third clock are generated from the fourth clock, the fifth clock being substantially identical to the third clock. The second clock is then generated from the fifth clock. The fourth clock is generated by a first phase locked loop having the first and second clocks as its inputs and the second clock is generated by a second phase locked loop connected to a clock tree, the second phase locked loop having the fifth clock and the second clock as its inputs.

23 Claims, 3 Drawing Sheets

METHOD AND APPARATUS FOR DE-SKEWING A CLOCK USING A FIRST AND SECOND PHASE LOCKED LOOP AND A CLOCK TREE

FIELD

The present invention relates to a multiple clock domain de-skewing technique. More particularly, the present invention relates to a multiple clock domain de-skewing technique utilizing dual PLL (Phase Locked Loop) loops to de-skew clock signals of three different domains.

BACKGROUND

There are many systems, such as an MPT (Memory Protocol Translator), which transfer data between two different systems, such as two different memory systems. Using the two memory system and MPT arrangement as an example, there are three different clock signal domains, namely, the clock signals of each of the two memory systems and the clock signals of the MPT. In order for the arrangement to operate properly, the three different clock signals must be de-skewed.

FIG. 1 illustrates an example of an earlier disadvantageous arrangement for de-skewing clock signals. As shown in FIG. 1, a memory system, such as SDRAM (Synchronous Dynamic Random Access Memory) 170 is connected to an MPT 100 via transmission lines 171, 172, 173, 174, and 175 and a CLK BUFF (Clock Buffer) 160. The clock outputted by the MPT clock output buffer 151 is inputted through transmission line 171 to the clock buffer 160. The clock buffer 160 has one output which is inputted to the SDRAM 170 via transmission line 175 and has another output which is fed back to the MPT 100 via transmission line 172. The two outputs of the clock buffer 160 are substantially identical.

Contained within the MPT 100 are flip-flops 120 and 130 which respectively output and input RDRAM data to an output flip-flop 150 and an input flip-flop 140. The feedback clock inputted to the MPT 100 from the transmission line 172 is inputted to a clock tree 180 via an input clock buffer 152. The output clock CLK of the clock tree 180 is used to clock both the output and input flip-flops 150 and 140 and is also inputted to a PLL 110. The output of the output flip-flop 150 is inputted to the SDRAM 170 via an output buffer 153 and the transmission line 173. The output of the SDRAM 170 is inputted to the input flip-flop 140 via the transmission line 174 and an input buffer 154.

The phase of the clock CLK is adjusted by the PLL 110 so as to match the phase of the reference clock rclkref of the MPT 100. Ideally, the clock inputted to the SDRAM 170 via the transmission line 175 should always be in phase with respect to the clock CLK to insure the proper transmission of data between the MPT 100 and the SDRAM 170. Unfortunately, in reality, this is not the case since the path for the clock from the output of the PLL 110 to the SDRAM 170 is different than the path of the clock outputted from the PLL 110 to the output of the clock tree 180. Since the paths are different, there are differences in phase which are dependent upon the behavior of the clock buffer 160 and the characteristics of the clock tree 180. That is, ideally, the clock which is inputted to the SDRAM 170 via the transmission line 175 should begin at the same time as the clock inputted to the output flip-flop 150. However, the delays in the transmission lines 171, 172, and 175 may vary as will the delays in the CLK BUFF 160 and the clock output buffer 151, clock input buffer 152, and the clock tree 180. These delays will vary over time due to changes in ambient conditions and aging and will also vary from element to element. The characteristics of the clock tree 180 will vary from one integrated circuit die to another due to process variations as well as varying over time due to voltage variations and temperature variations.

Thus, while the internal MPT clock CLK is de-skewed (that is, in phase) with respect to the reference clock rclkref (the clock of the RDRAM interface), the input/output clock is not in phase with the SDRAM clock and due to the clock skew, it is fairly difficult to meet the AC timing requirements (e.g.—minimum and maximum output delay, setup time, and hold time) on the SDRAM interface.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
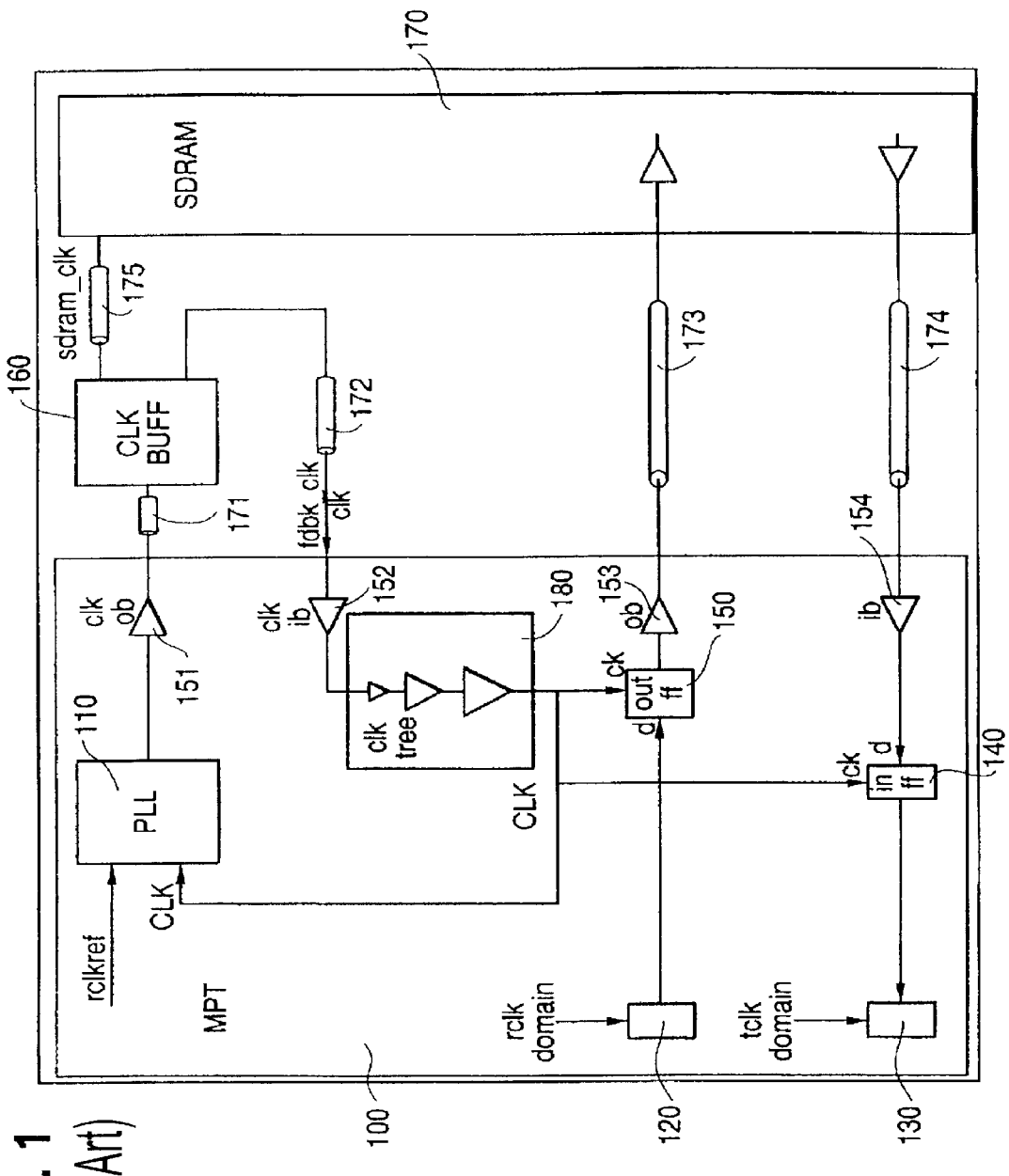
FIG. 1 illustrates an example of an earlier disadvantageous arrangement for de-skewing clock signals.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, well-known power connections and other well-known components may not be shown within the drawing figures for simplicity of illustration and discussion and so as not to obscure the invention.

Figure 2:
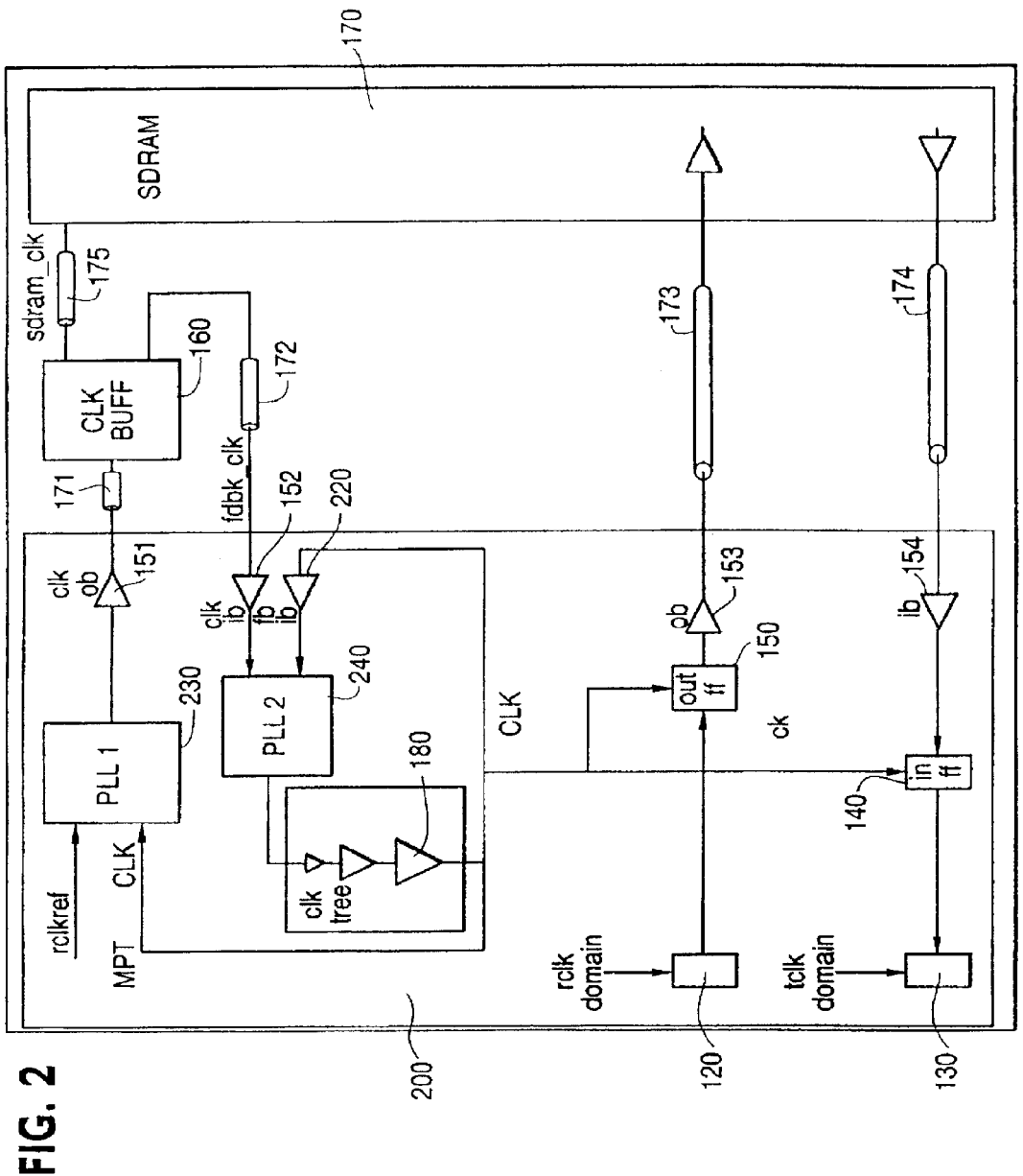
FIG. 2 illustrates an example of an arrangement for de-skewing clock signals in accordance with the technique of an embodiment of the present invention.

FIG. 2 illustrates an example of an arrangement for de-skewing clock signals in accordance with the technique of an embodiment of the present invention. The difference between the arrangement of FIG. 1 and the arrangement of FIG. 2 lies in the use of phase locked loop PLL1, denoted as element 230 in FIG. 2, and phase locked loop PLL2, denoted as element 240 in FIG. 2, in place of the single PLL 110 of FIG. 1. PLL1 corresponds to PLL 110 of FIG. 1 in purpose and arrangement. On the other hand, rather than directly inputting the feedback clock from the transmission line 172 to the clock tree 180 via the clock buffer 152, the feedback clock is inputted to one input of PLL2 via the clock buffer 152 and the clock CLK is inputted to another input of PLL2 via a feedback buffer 220. Normally, PLL1 and PLL2 would be identical although there is no necessity that they be identical.

By the arrangement shown in FIG. 2, PLL1 insures that the clock CLK is in phase with the reference clock rclkref, that is, the clock CLK is de-skewed with respect to the reference clock rclkref. PLL2 insures that the clock CLK is in phase with the feedback clock outputted from the transmission line 172, that is, the clock CLK is de-skewed with respect to the feedback clock fdbk_clk outputted from the transmission line 172 and since the feedback clock fdbk_clk is substantially identical to the sdram_clk inputted to the SDRAM, the clock CLK is de-skewed with respect to the SDRAM input clock sdram_clk. That is, by the arrangement shown in FIG. 2, a first clock rclkref is received and a fourth clock generated by PLL1 from the first clock and second clock CLK. A fifth clock fdbk_clk and a third clock sdram_clk are generated by the CLK BUFF from the fourth clock. The second clock CLK is generated from the fifth clock fdbk_clk by PLL2. Accordingly, the second and third clocks are de-skewed with respect to the first clock.

Thus, by the arrangement shown in FIG. 2, AC timing requirements can be easily met since all of the clocks are now in phase with each other.

Note that for simplicity, only a single SDRAM with a single clock input and a single data input and output has been shown. It is of course understood that the MPT would normally be connected to a plurality of SDRAMs each having a data input and output and the clock buffer CLK BUFF would have a plurality of clock outputs so as to supply clock signals to each of the SDRAMs as well as the feedback clock to the MPT.

Figure 3:
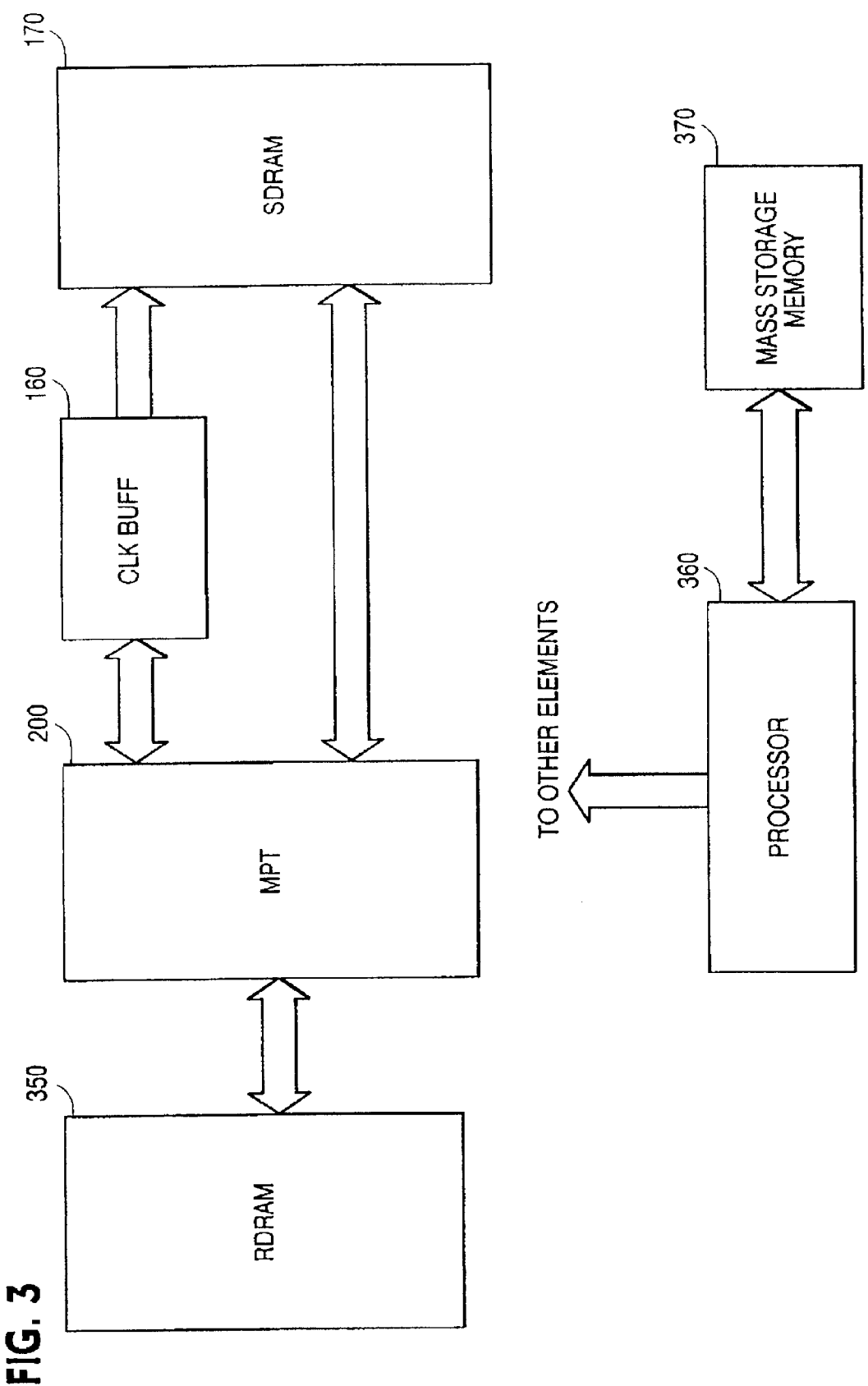
FIG. 3 illustrates a example of a system including an arrangement for de-skewing clock signals in accordance with the technique of an embodiment of the present invention.

FIG. 3 illustrates an example of a system including an arrangement for de-skewing clock signals in accordance with the technique of an embodiment of the present invention. As shown in FIG. 3, the RDRAM 350 is connected to the MPT 200 which is in turn connected to the clock buffer 160 and SDRAM 170 in the same fashion as that shown in FIG. 2. A processor 360 is connected to a mass storage memory 370 as well as being connected to all of the other elements shown in FIG. 3. Various interconnections and other commonly used elements of the system had not been shown for the sake of simplicity.

By the use of the MPT 200, as shown in FIG. 3, the clock signals may be de-skewed so as to allow the optimal transfer of data between the RDRAM 350 and the SDRAM 170.

This concludes the description of the example embodiment. Although the present invention has been described with reference to an illustrative embodiment, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

For example, while the present invention has been illustrated as being used in a memory protocol translator disposed between two memory systems, it is not limited thereto but rather may be used with any data interface disposed between two systems so as to insure the de-skewing of the clock signals of the two systems and the data interface.

What is claimed is:

1. A method of de-skewing second and third clocks with respect to a first clock, the method comprising:
receiving the first clock;
generating a fourth clock from the first and second clocks;
generating a fifth clock and the third clock from the fourth clock, the fifth clock being substantially identical to the third clock; and
generating the second clock from the fifth clock;
wherein the fourth clock is generated by a first phase locked loop having the first and second clocks as its inputs and wherein the second clock is generated by a second phase locked loop connected to a clock tree, the second phase locked loop having the fifth clock and the second clock as its inputs.

2. The method of claim 1, further comprising providing a clock buffer to generate the fifth clock and the third clock from the fourth clock.

3. The method of claim 2, further comprising transmitting the fourth clock from the first phase locked loop to the clock buffer via an output buffer and a transmission line.

4. The method of claim 2, further comprising transmitting the fifth clock to the second phase locked loop via another transmission line and an input buffer.

5. A de-skewing apparatus to de-skew second and third clocks with respect to a first clock, the apparatus comprising:
a first phase locked loop having a first input to receive the first clock and having a second input to receive the second clock, the first phase locked loop to generate a fourth clock;
a buffer having an input to receive the fourth clock and having a first output to output the third clock and a second output to output a fifth clock, the fifth clock being substantially identical to the third clock; and
a second phase locked loop having a first input to receive the fifth clock and having a second input to receive the second clock and having an output connected to an input of a clock tree having an output to output the second clock.

6. The apparatus of claim 5, further comprising a clock buffer to generate the fifth clock and the third clock from the fourth clock.

7. The apparatus of claim 6, further comprising an output buffer and a transmission line to transmit the fourth clock from the first phase locked loop to the clock buffer.

8. The apparatus of claim 6, further comprising another transmission line and an input buffer to transmit the fifth clock to the second phase locked loop.

9. The apparatus of claim 5, further comprising another input buffer to transmit the second clock to the second phase locked loop.

10. An interface apparatus to couple first and second memory systems, said apparatus comprising:
a first phase locked loop having a first input to receive a reference clock and having a second input to receive an internal clock, the first phase locked loop to generate a first output clock;
a buffer having an input to receive the first output clock and having a first output to output a second memory clock and a second output to output a feedback clock, the feedback clock being substantially identical to the second memory clock; and
a second phase locked loop having a first input to receive the feedback clock and having a second input to receive the internal clock and having an output connected to an input of a clock tree, the clock tree having an output to output the internal clock.

11. The apparatus of claim 10, further comprising a data transmission chain to transmit data from the first memory system to the second memory system, the data transmission chain comprising a first memory element to latch data from the first memory system in accordance with the reference clock and a second memory element to latch data from the first memory element in accordance with the internal clock, an output of the second memory element being connected to a data input of the second memory system.

12. The apparatus of claim 11, wherein the first and second memory elements respectively comprise flip-flops.

13. The apparatus of claim 11, further comprising a buffer and transmission line to connect the output of the second memory element to the data input of the second memory system.

14. The apparatus of claim 10, further comprising a data transmission chain to transmit data from the second memory system to the first memory system, the data transmission chain comprising a first memory element to latch data from the second memory system in accordance with the internal clock and a second memory element to latch data from the first memory element in accordance with the reference clock, an output of the second memory element being connected to a data input of the first memory system.

15. The apparatus of claim 14, wherein the first and second memory elements respectively comprise flip-flops.

16. The apparatus of claim 14, further comprising a transmission line and a buffer to connect the output of the second memory system to a data input of the second memory element.

17. A computer apparatus comprising:

a processor for controlling the computer apparatus;

a first memory system and a second memory system; and an interface apparatus to couple the first and second memory systems, the interface apparatus comprising:

a first phase locked loop having a first input to receive a reference clock and having a second input to receive an internal clock, the first phase locked loop to generate a first output clock;

a buffer having an input to receive the first output clock and having a first output to output a second memory clock and a second output to output a feedback clock, the feedback clock being substantially identical to the second memory clock; and a second phase locked loop having a first input to receive the feedback clock and having a second input to receive the internal clock and having an output connected to an input of a clock tree, the clock tree having an output to output the internal clock.

18. The computer apparatus of claim 17, the interface apparatus further comprising a data transmission chain to transmit data from the first memory system to the second memory system, the data transmission chain comprising a first memory element to latch data from the first memory system in accordance with the reference clock and a second memory element to latch data from the first memory element in accordance with the internal clock, an output of the second memory element being connected to a data input of the second memory system.

19. The computer apparatus of claim 18, wherein the first and second memory elements respectively comprise flip-flops.

20. The computer apparatus of claim 18, the interface apparatus further comprising a buffer and a transmission line to connect the output of the second memory element to the data input of the second memory system.

21. The computer apparatus of claim 17, the interface apparatus further comprising a data transmission chain to transmit data from the second memory system to the first memory system, the data transmission chain comprising a first memory element to latch data from the second memory system in accordance with the internal clock and a second memory element to latch data from the first memory element in accordance with the reference clock, an output of the second memory element being connected to a data input of the first memory system.

22. The computer apparatus of claim 21, wherein the first and second memory elements respectively comprise flip-flops.

23. The computer apparatus of claim 21, the interface apparatus further comprising a transmission line and a buffer to connect the output of the second memory system to a data input of the second memory element.

* * * * *

UNITED STATES PATENT AND TRADEMARK OFFICE
CERTIFICATE OF CORRECTION

PATENT NO.    : 6,810,486 B2
DATED         : October 26, 2004
INVENTOR(S)   : Eyal Fayneh and Ernest Knoll It is certified that error appears in the above-identified patent and that said Letters Patent is hereby corrected as shown below:

<u>Title page,</u>
Item [75], Inventors, delete "Earnest" and insert -- Ernest --, therefor.

Signed and Sealed this

Eighteenth Day of January, 2005

JON W. DUDAS
*Director of the United States Patent and Trademark Office*